Dec. 8, 1925.  1,564,730
A. S. WALDEN
PROCESS OF CALCINING MATERIAL
Filed March 24, 1921
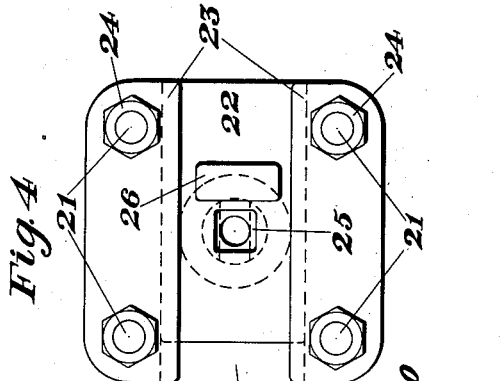
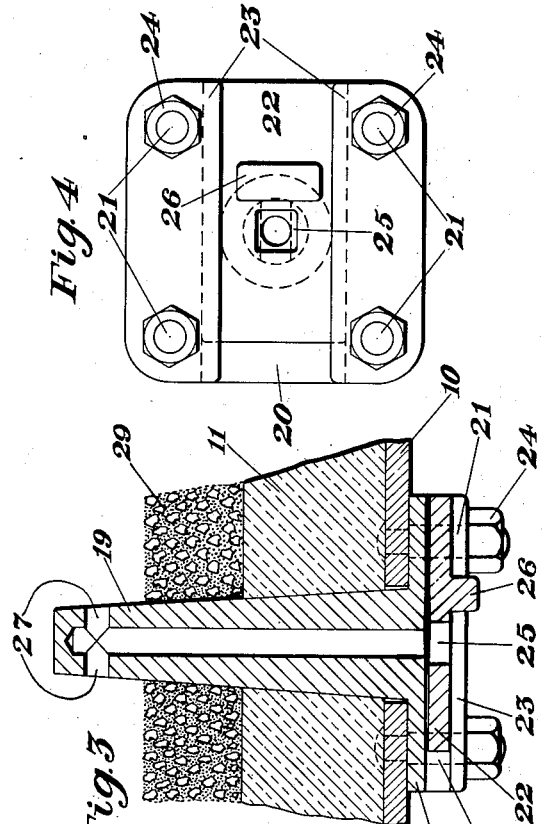
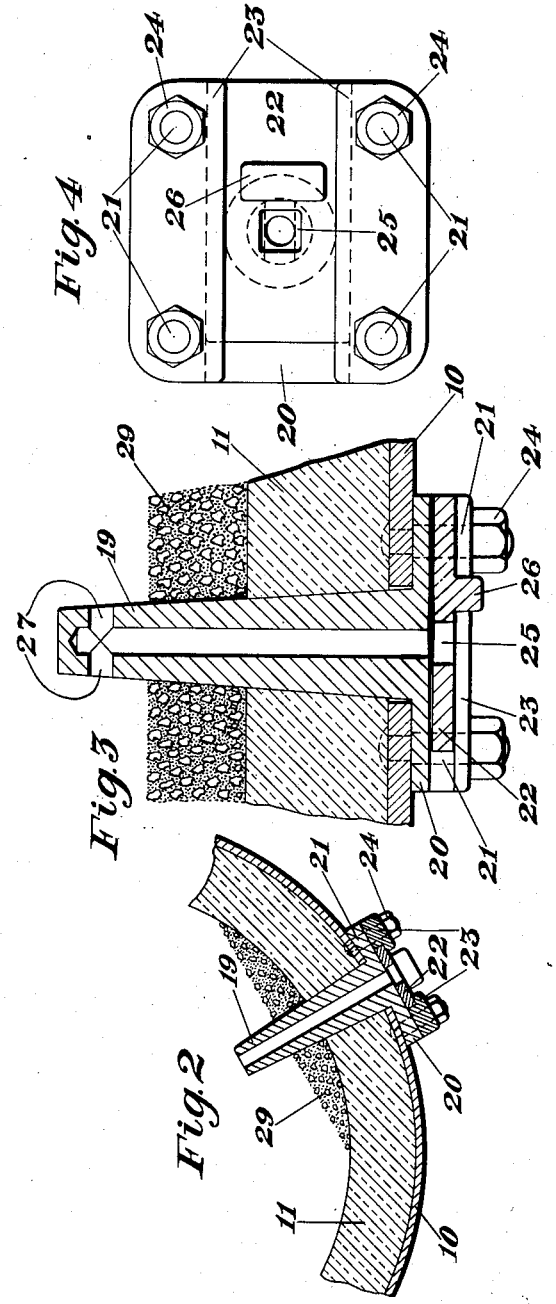
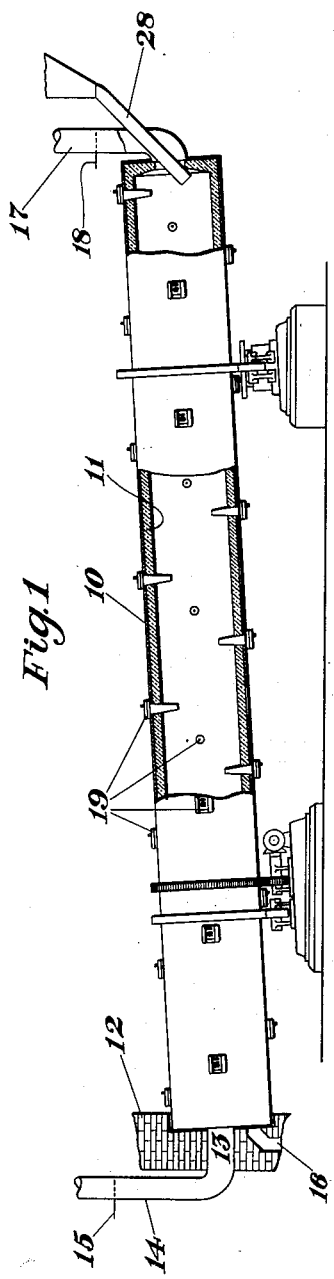
INVENTOR.
Albert S. Walden
BY
Byrnes Townsend Bridentein
ATTORNEYS.

Patented Dec. 8, 1925.

1,564,730

UNITED STATES PATENT OFFICE.

ALBERT S. WALDEN, OF CLEVELAND, OHIO, ASSIGNOR TO NATIONAL CARBON COMPANY, INC., A CORPORATION OF NEW YORK.

PROCESS OF CALCINING MATERIAL.

Application filed March 24, 1921. Serial No. 455,300.

*To all whom it may concern:*

Be it known that I, ALBERT S. WALDEN, a citizen of the United States, residing at Cleveland, in the county of Cuyahoga and State of Ohio, have invented certain new and useful Improvements in Processes of Calcining Material, of which the following is a specification.

My invention relates to processes wherein a material capable of being decomposed by heat into a volatile combustible portion and an oxidizable solid residue is calcined to expel more or less of the combustible gas, the latter being burned to furnish the heat required for the calcination.

The object of my invention is to provide a process for the above purpose which will produce the desired expulsion of the volatile matter and the combustion thereof without harmful or wasteful oxidation of the non-volatile residue and which will operate with a high heat economy and a low cost of upkeep. Other objects will hereafter appear.

My invention will be described in connection with the calcination of carbonaceous material, such as petroleum coke, to produce a residue suitable for the manufacture of electrodes, brushes, battery depolarizing mix and other purposes in the electrical arts. While my process is particularly adapted for such use, it will be understood that reference to such use is not intended to impose any restrictions on the appended claims.

The reasons for calcining such materials as those mentioned above to remove the volatile matter, are well understood, the process being generally applied to all carbonaceous materials intended for the above-mentioned uses. In modern installations now used for the purpose, the heat necessary for the calcination is furnished by the combustion of the evolved gases themselves, so that when the operation is once started it is thermally self-supporting. This feature is also utilized in my process as stated above. As it is necessary to protect the non-volatile residue from oxidation in order to prevent excessive losses of material and concentration of ash in the product, it has been deemed necessary by those engaged in this art to carry out the calcination in muffles. Muffle furnaces involve the use of high-grade refractories and complicated construction, so that first cost and upkeep are high. Furthermore, the thermal efficiency of the process as carried out in muffles is necessarily limited by the fact that all the heat used in the calcination must be transmitted through the muffle walls.

In accordance with my invention, the use of muffles with its inherent disadvantages is avoided by burning the volatile matter in the chamber wherein the material undergoing calcination is located, whereby transmitting heat to the material under treatment by radiation and convection instead of by conduction through refractory materials.

The process of my invention is preferably, though not necessarily, carried out in a furnace in the form of an inclined rotatable tubular shell through which the material is caused to pass while its volatile portions are being expelled, the air required to burn the volatile matter and so produce the requisite heat being admitted through a series of tuyères in the walls of the shell.

For a better understanding of my invention, reference is made to the accompanying drawings, in which—

Fig. 1 is a longitudinal section of the apparatus of my invention,

Fig. 2 is a fragmentary view on a transverse section of the calciner and along the axis of one of the tuyères, Fig. 3 is a fragmentary view on a longitudinal section of the calciner and along the axis of a tuyère, showing a tuyère, of modified construction, and Fig. 4 is an end view of one of the tuyères showing means for regulating the flow of air therethrough.

In the apparatus illustrated in the drawings, a tubular shell of steel plates 10 having a refractory lining 11 of fire-brick or the like, is suitably supported with its axis forming a small angle with the horizontal, and is provided with mechanism for slowly rotating it. Any suitable supporting and rotating means such as are generally used in conjunction with rotary kilns, may be employed.

The lower end of the shell enters the housing 12 which fits the end of the shell as closely as possible. The duct 13 in the housing connects with a stack 14, and a proper draft, either natural or induced, serves to draw off waste gases from the shell, the volume of gases withdrawn being controlled in any suitable way as by the damper diagrammatically shown at 15.

A second duct 16 in the housing 12 serves to carry the material discharged from the kiln to a cooler, not shown. It will be understood by those skilled in the art that since the carbonaceous material is discharged from the kiln at a temperature above its ignition point, it must be protected from air until sufficiently cooled. Apparatus to protect the calcined material from air until it is cooled and to then convey it to the place of storage or use, is well known in the art and need not be further described.

The upper end of the kiln is connected with a stack 17 having a damper 18 and otherwise similar to the stack 14, though preferably of larger capacity. The upper end of the kiln is also provided with the feed-member 28, through which the raw material is conveyed to the kiln, the rate of feed being controlled in any suitable way. Positive feeding means may of course be employed.

Projecting through the walls of the shell are tuyères 19. These are preferably symmetrically arranged about the shell and are disposed along a considerable portion of the length of the shell. To provide for all contingencies, the tuyères may be distributed throughout the entire length of the shell as shown, means being provided for closing off any tuyères not required, as hereinafter described. Obviously, the tuyères may be larger or more closely spaced in portions of the kiln requiring more air. The tuyère is a tube of oxidation-resisting material such as ferrochrome, projecting far enough beyond the inner surface of the shell-lining so that it will at all times stand above the surface of the material 29 undergoing treatment in the kiln, and preferably clearing such surface by a considerable distance. The tuyère is suitably attached to the shell, as by a flange 20, drilled for the bolts 21. Means for controlling the passage of air through a tuyère is shown in Figs. 2, 3 and 4. Such means may consist, for example, of a slide 22 movable in guides formed by channeled strips 23 attached to flange 20 by bolts 21 and nuts 24. An aperture 25 in the slide may be moved into more or less complete registry with the duct in the tuyère, thereby controlling the passage of air therethrough. A lug 26 is formed on the slide 22 for the convenience of the attendant in moving the slide, and friction will hold the slide in any position to which it is moved.

In calcining certain kinds of material, there is a possibility that the tuyères may become clogged due to the material being carried sufficiently high by the rotation of the shell to cause it to drop into the tuyères below. For this reason, the tuyères may have lateral openings 27, such as are illustrated in Figs. 3 and 4.

In accordance with my invention, the material under treatment is calcined chiefly by heat radiated from a flame adjacent the surface of the material, the flame being maintained by combustible gas evolved from the material. Since the solid residue produced is readily oxidizable when at elevated temperatures, it must be protected from an oxidizing atmosphere when it is heated. If a flame is produced by the introduction of a restricted jet of air into an atmosphere of combustible gas, the zones of the flame will be reversed and the most reducing or least oxidizing portion of the flame will lie at its outer extremities. Therefore, by maintaining a considerable layer of evolved combustible gas over the hot material undergoing calcination and permitting air to impinge on this gas layer only at points removed from the surface of the material, oxidation of the non-volatile residue may be suppressed, providing the quantity of air supplied is not excessive.

To prevent oxidation of the hot non-volatile residue, it may be necessary to so restrict the air supply that the combustible gas will not be completely consumed and a loss in thermal efficiency will thereby arise. However, it is necessary to carefully guard against oxidizing conditions only in the regions where the material under treatment is heated above certain temperatures, such temperatures being determined by the characteristics of the particular material treated and being the temperatures at which the non-volatile residue produced is seriously oxidized. In order to utilize all the calorific values of the evolved gases, their complete oxidation may be caused to take place out of contact with the hot material, and may be advantageously brought about so as to preheat the material which is still not hot enough to be seriously affected by oxidation. Likewise, if the raw material is wet, the heat evolved during the complete combustion of the volatile matter may be used to dry it. In some cases the evolved gases are capable of producing an amount of heat considerably in excess of that required in the calcining operation, and this may be utilized for extraneous purposes.

In carrying out the process in the apparatus illustrated in the drawings, the material to be calcined is introduced through the feed 28 at a suitable rate, the furnace having been first brought to its proper working temperature, for example by auxiliary burners, not shown, with which it may be provided. During the progress of the material through the kiln, its temperature will increase, and the expulsion of volatile matter will begin and continue at an increasing rate. Air admitted through the tuyères 19 will burn the evolved gas as already outlined. Since the inner ends of the tuyères extend considerably beyond the layer of material in the lower part of the kiln, combustion of the evolved gas will take place without access of oxidizing gases to the material if the supply of air is properly regulated. The greater part of the combustion gases will pass toward the upper end of the kiln, giving up their sensible heat to the descending solid material, more air being admitted if necessary in the cooler parts of the kiln to complete the combustion.

Any air drawn in between the lower end of the shell and the housing 12 will immediately pass up the stack 15 without coming into contact with the hot calcined material sufficiently to oxidize it. It will be obvious that the material will feed through the kiln due to the slow rotation of the latter and will be discharged in a fully calcined state through the duct 16.

The stack 17 may be suitably modified where there is an excess of heat to be utilized for extraneous purposes. If the total calorific value of the evolved gases is very high, a deficiency of air may be maintained in all parts of the kiln, complete combustion being permitted only in auxiliary apparatus to which the waste gases are led. The character of the gases in any zone of the kiln may be regulated by adjusting the air controlling devices of the individual tuyères.

I claim:

1. Process of treating material capable of yielding on heating a combustible volatile portion and an oxidizable solid residue, which comprises moving a stream of the material through regions of successively increasing temperatures, the temperature at which the solid residue begins to undergo substantial oxidation being that of an intermediate region, incompletely burning the evolved gases with a deficiency of oxygen in the regions hotter than said intermediate region, and substantially completely burning the residual gases in the cooler regions.

2. Process of treating material capable of yielding on heating a combustible volatile portion and an oxidizable solid residue, which comprises agitating and moving a stream of the material through regions of successively increasing temperatures, the temperature at which the solid residue begins to undergo substantial oxidation being that of an intermediate region, incompletely burning the evolved gases with a deficiency of oxygen in the regions hotter than said intermediate region, and substantially completely burning the residual gases in the cooler regions.

3. Process of treating material capable of yielding on heating a combustible volatile portion and an oxidizable solid residue, which comprises moving a stream of the material through regions of progressively increasing temperatures with increasing evolution of volatile matter, burning the volatile matter in the various regions, said burning being effected in proximity to the material by oxygen admitted in a plurality of regulatable streams, maintaining reducing conditions in the regions where the temperature is above that at which the solid residue undergoes substantial oxidation, and substantially completely burning the volatile matter in the cooler regions.

4. Process of treating material capable of yielding on heating a combustible volatile portion and an oxidizable solid residue, which comprises passing the material through a series of regions of progressively increasing lower temperatures to a region where the temperature is sufficiently high to promote substantial oxidation of the non-volatile portion of the material, then passing the material through a series of regions of higher temperature and admitting oxygen in regulatable streams to all the various regions, the oxygen admitted to the regions of higher temperature being insufficient for the complete combustion of the volatile matter there evolved, removing the unburnt residual volatile matter to the regions of lower temperature to mingle with the volatile matter there evolved, and substantially completely burning all the volatile matter in said regions of lower temperature.

5. Process of treating material capable of yielding on heating a combustible volatile portion and an oxidizable solid residue, which comprises heating the material to a temperature sufficiently high to produce and ignite an envelope of combustible gas around it, partially burning the gas of said envelope with oxygen supplied in amount insufficient for complete combustion, whereby a region of non-oxidizing conditions is produced, bringing the unconsumed residual gas in proximity to another portion of material at a temperature below that at which it undergoes substantial oxidation, there burning the gas to preheat the material, and advancing the preheated material to the region of non-oxidizing conditions.

In testimony whereof, I affix my signature.

ALBERT S. WALDEN.